United States Patent Office 3,808,193
Patented Apr. 30, 1974

---

3,808,193
PURIFICATION OF AZO- AND AZOXYBENZENE 3,3',4,4' - TETRACARBOXYLIC ACID WITH DIOXANE AND COMPLEXES THEREOF
Maurice Balme, Sainte-Foyles-Lyon, and Bernard Rollet, Lyon, France, assignors to Rhone-Poulenc S.A., Paris, France
No Drawing. Original application May 8, 1969, Ser. No. 823,166, now abandoned. Divided and this application Dec. 14, 1971, Ser. No. 207,952
Int. Cl. C07c 63/32, 105/00, 107/06
U.S. Cl. 260—143                                7 Claims

ABSTRACT OF THE DISCLOSURE

A process for purifying aromatic dianhydrides, in particular azobenzene-3,3',4,4'-tetracarboxylic acid dianhydride and azoxybenzene - 3,3',4,4' - tetracarboxylic acid dianhydride which process comprises contacting the dianhydride with dioxane and isolating and then decomposing the dianhydride dioxane complex so formed to obtain the substantially pure dianhydride.

---

This is a division of application Ser. No. 923,166 filed May 8, 1969, and now abandoned.

The present invention relates to the purification of aromatic dianhydrides.

Aromatic dianhydrides are useful in the preparation of heatstable polymers. To obtain high-quality polymers it is necessary to use very pure dianhydrides.

Polyamide-acids obtained by reaction of aromatic dianhydrides with di-primary diamines in a polar solvent illustrate this point. It has in fact been observed that the polyimides obtained by the cyclization of the said polyamide-acids possess mechanical thermal properties which are the better the higher is the intrinsic viscosity of the latter. However, the presence of impurities in the dianhydrides used prevents the attainment of adequately high viscosities.

The aromatic dianhydrides generally obtained by oxidation of bis-ortho-dialkyl aromatic derivatives have too high an impurity content to enable them to be used without purification. These impurities mainly consist of diacids, triacids and tetraacids and the anhydrides of the di- and tri-acids.

French patent specification No. 1,467,485 proposes that these dianhydrides should be purified by forming addition compounds between them and certain aromatic hydrocarbons. Although the complexes so formed produce good quality dianhydrides on heating, the yield of this purification is in general mediocre.

Pyromellitic anhydride has also been purified by recrystallization from various solvents, e.g. acetic anhydride or ethyl acetate. It is difficult to adapt such processes to use on an industrial scale because of the low solubility on heating of pyromellitic anhydride in the solvents.

French patent specification No. 1,471,932 describes a process for the purification of pyromellitic anhydride which comprises washing the pyromellitic anhydride with ketones. However, a large amount of the anhydride becomes dissolved in the ketone used and this therefore means that a supplementary recovery operation is necessary.

The present invention provides a process for the purification of aromatic dianhydrides of the general formula

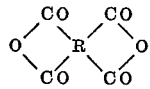

in which R represents a tetravalent aromatic radical. The process of the invention depends principally on the hitherto unkonwn property of the aromatic dianhydrides of forming complexes with dioxane from which the starting materials may be easily recovered. The process of this invention comprises contacting the dianhydride with dioxane in a heterogeneous phase, and isolating and then decomposing the complex so formed to obtain the substantially pure dianhydride.

The tetravalent aromatic radical R can be a mononuclear or a polynuclear aromatic radical or a radical consisting of two or more mononuclear and/or polynuclear aromatic radicals linked by valence bonds or through atoms or radicals. The atoms or radicals which can link these cyclic aromatic systems may be, for example, oxygen, sulphur or phosphorus atoms or alkylene radicals preferably having 1 to 3 carbon atoms, the groups

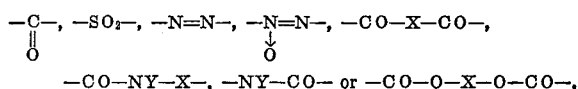

in which Y represents hydrogen, an alkyl radical having 1 to 4 carbon atoms, a cycloalkyl radical or mononuclear or polynuclear aryl radical and X represents a linear or branched alkylene radical having 1 to 12 carbon atoms, a cycloalkylene radical containing 5 or 6 carbon atoms in the ring, or a mononuclear or polynuclear arylene radical.

The minimum amount of dioxane used is theoretically one molecule for each dianhydride molecule. In practice it is preferable to use a larger amount of dioxane than this. A large excess is not detrimental to the purification but to avoid a prohibitive use of the dioxane it is preferable not to exceed the minimum quantity giving an easily stirred reaction medium.

The aromatic dianhydrides are conveniently mixed with dioxane at ordinary temperatures, i.e. 5 to 40° C.; there is generally little advantage in exceeding these limits. The mixture is stirred, preferably in an inert gas atmosphere, for the time necessary for the reaction, which varies according to the aromatic dianhydride purified but is generally about 1 to 5 hours.

The complexes thus formed, which are new compounds, can be isolated from the reaction medium by centrifugation or by filtration, suction-dried and optionally washed with a little dioxane. They can be obtained in a pure state by evaporating the excess dioxane at ordinary temperatures under reduced pressure. It should however be pointed out that too low a pressure must cause the complexes to decompose. It is important in each case to use an optimum pressure, i.e. that which enables the pure complex to be obtained in minimum time with substantially no decomposition of the complex. The analysis of these complexes shows that they consist of one molecule of aromatic dianhydride and one molecule of dioxane.

When carrying out the process of this invention it is not necessary to isolate the complexes in the pure state. In general the product obtained by filtration and optional washing with a little dioxane is directly decomposed to liberate the purified dianhydrides. This decomposition may be carried out by heating and/or the application of subatmospheric pressure.

Obviously, the rate of decomposition depends on the nature of the complex employed, and the temperature and pressure used. In general the rate will be proportionately faster the higher the temperature and the lower the pressure. Therefore, it is not possible to state precisely operating conditions which would be applicable to all cases. However, when the dianhydride is pyromellitic anhydride the decomposition is complete after 1 hour at 130° C. under atmospheric pressure, is very small at 60° C. under the same pressure and in nil after 48 hours at 20° C. under a pressure of approximately 10 mm. of mercury. When the dianhydride is the anhydride of azoxybenzene- 3,3',4,4'-tetracarboxylic acid the complex formed is decomposed after 24 hours at 25° C. under a pressure of 1 mm. of mercury.

When decomposition is carried out by heating at atmospheric pressure or under reduced pressure it is preferable to carry out the operation under conditions which exclude all moisture, e.g. in an atmosphere of a dry gas.

The aromatic dianhydrides purified by the new process contain practically no impurities and can be used in the production of excellent quality polycondensates. Thus, when reacted with diprimary diamines they produce polyamide-acids, having a high intrinsic viscosity.

The following examples illustrate the invention.

EXAMPLE 1

150 g. of crude pyromellitic dianhydride and 700 ml. of pure dioxane are introduced into a 2-liter flask equipped with a mechanical stirrer, under an atmosphere of nitrogen and at ordinary temperature. The temperature rapidly rises from about 15 to approximately 20° C. and the mixture thickens. The mixture is stirred for 2 hours 30 minutes, then filtered and the product washed with 4× 125 ml. of dioxane. The washed precipitate so obtained is divided.

One-half is placed in a dessicator and dried at ambient temperature (20° C.) under a pressure of 1 mm. of mercury for 48 hours. 102.9 g. of pyromellitic dianhydride/dioxane complex (molecular weight found 306.5; theory 306.2) are so obtained. 70.3 g. of this pyromellitic dianhydride/dioxane complex are maintained at 120° C. under atmospheric pressure for two hours. The loss of weight is 2.98 g. The equivalent molecular weight of the residue is 218, and it is identified as pyromellitic dianhydride.

The second half is maintained at 120° C. under atmospheric pressure for two hours and 73.2 g. of pure pyromellitic dianhydride are obtained.

A polyamide-acid can be prepared from this anhydride in the following manner: 250 ml. of dimethylacetamide and 19.02 g. of bis-(4-aminophenyl)ether are introduced into a 1 liter cylindrical glass reaction vessel under an atmosphere of nitrogen and cooled by circulating water at 20° C. After the amine has dissolved 20.73 g. of purified pyromellitic dianhydride and 155 ml. of dimethylacetamide are added. The reaction is exothermic and the temperature rises from about 20 to about 25° C. After 2 hours reaction the inherent viscosity of the polyamide-acid is 1.24 dl./g. (viscosity measured at 25° C. for a 0.5% solution in dimethylacetamide). 0.34 g. of pure pyromellitic dianhydride dissolved in 14.4 ml. of dimethylacetamide are then added. The viscosity rises considerably and after stirring at ambient temperature for 2 hours a polyamide-acid having an intrinsic viscosity of 2.8 dl./g. is obtained.

EXAMPLE 2

500 g. of pure dioxane are introduced into a 1-liter flask equipped with a mechanical stirrer under an atmosphere of nitrogen, and then 100 g. of the crude dianhydride of azobenzene - 3,3',4,4' - tetracarboxylic acid are added gradually. When the addition is complete the temperature rises from 29 to approximately 37° C. After stirring the reaction mixture for 2 hours, the precipitate is removed by filtration and washed with 4×125 ml. of dioxane. The precipitate is separated into two halves. The first half is left in a dessicator at 25° C. under a pressure of 100 mm. of mercury until constant in weight; 62.6 g. of complex (molecular weight found 413.6; theory 410.1) are obtained.

The second half is maintained at 120° C. under atmospheric pressure for 2 hours and 49 g. of the pure dianhydride of azobenzene-3,3',4,4'-tetracarboxylic acid are produced.

EXAMPLE 3

300 g. of pure dioxane are introduced into a 1-liter flask equipped with a mechanical stirrer under an atmosphere of nitrogen and then 100 g. of the crude dianhydride of azoxybenzene-3,3',4,4'-tetracarboxylic acid are added gradually. Then following the procedure described in Example 2, 61.6 g. of complex (molecular weight found 427.5; theory 426.1) and 48.9 g. of pure anhydride are obtained.

We claim:

1. An equimolecular complex of dioxane and an aromatic dianhydride selected from azobenzene-3,3',4,4'-tetracarboxylic acid dianhydride and azoxybenzene-3,3',4,4'-tetracarboxylic acid dianhydride.

2. A complex according to claim 1 of azobenzene-3,3',4,4'-tetracarboxylic acid dianhydride.

3. A complex according to claim 1 of azoxybenzene-3,3',4,4'-tetracarboxylic acid dianhydride.

4. A process for purifying an aromatic dianhydride selected from azobenzene-3,3',4,4'-tetracarboxylic acid dianhydride and azoxybenzene-3,3',4,4'-tetracarboxylic acid dianhydride which process comprises contacting the dianhydride with dioxane in a heterogeneous phase, isolating the complex so formed and then decomposing the latter by heating or the application of subatmospheric pressure or both, to obtain the substantially pure anhydride.

5. Process according to claim 4 wherein the dianhydride is the dianhydride of azobenzene-3,3',4,4'-tetracarboxylic acid.

6. Process according to claim 4, wherein the dianhydride is the dianhydride of azoxybenzene-3,3',4,4'-tetracarboxylic acid.

7. Process according to claim 4, wherein the dianhydride and dioxane are contacted at a temperature of 5 to 40° C.

References Cited

UNITED STATES PATENTS

| | | | |
|---|---|---|---|
| 3,182,073 | 5/1965 | Loncrini | 260—346.3 |
| 3,526,618 | 9/1970 | Horstmann et al. | 260—152 |
| 3,592,827 | 7/1971 | Bergman | 260—346.3 |

OTHER REFERENCES

Farbenfabriken, Chemical Abstracts, vol. 65, 17085 and 17086 (1966).

FLOYD D. HIGEL, Primary Examiner

U.S. Cl. X.R.

260—78 R, 78 TF, 152, 208, 346.3

UNITED STATES PATENT OFFICE
CERTIFICATE OF CORRECTION

Patent No. 3,808,193      Dated April 30, 1974

Inventor(s) Maurice Balme and Bernard Rollet

It is certified that error appears in the above-identified patent and that said Letters Patent are hereby corrected as shown below:

Column 1, in the heading please insert the priority as follows: --Claims priority, application French 151,198 filed May 9, 1968--.

Signed and sealed this 21st day of January 1975.

(SEAL)
Attest:

McCOY M. GIBSON JR.
Attesting Officer

C. MARSHALL DANN
Commissioner of Patents